Nov. 15, 1966  V. L. STOUT  3,285,687
GETTERING APPARATUS
Filed Dec. 30, 1963
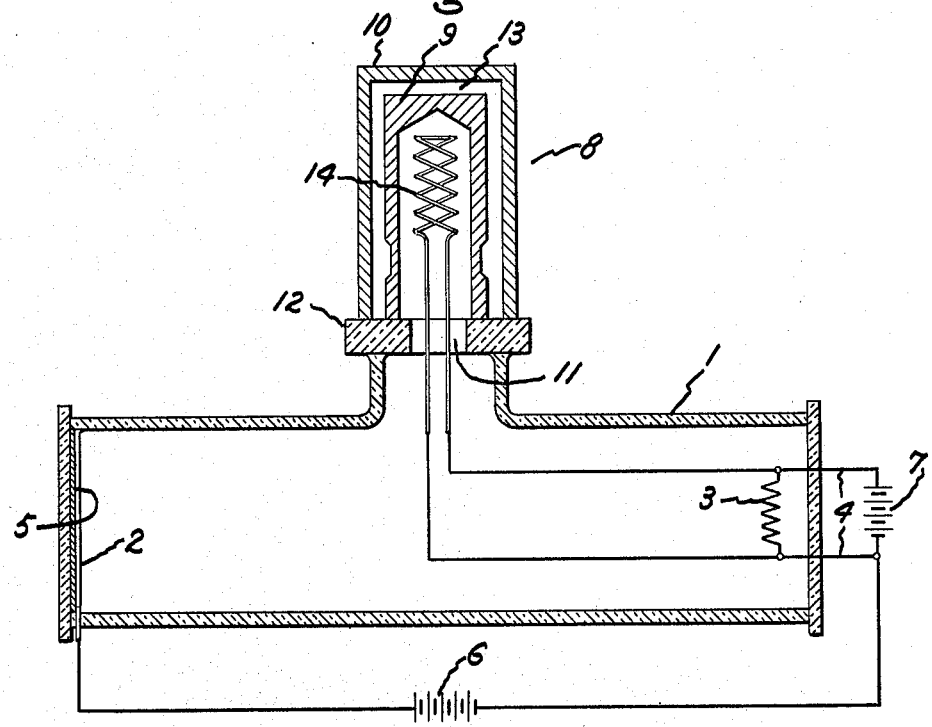
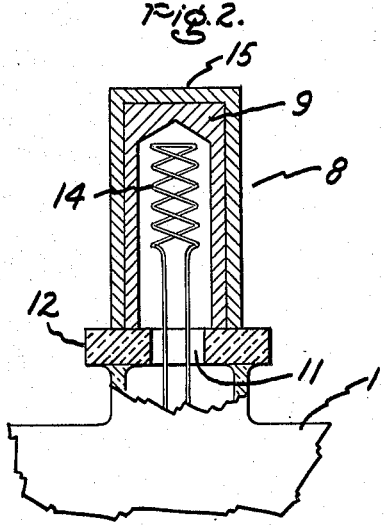
Inventor:
Virgil L. Stout,
by John P. Dellett
His Attorney.

United States Patent Office 3,285,687
Patented Nov. 15, 1966

3,285,687
GETTERING APPARATUS
Virgil L. Stout, Schenectady, N.Y., assignor to General
Electric Company, a corporation of New York
Filed Dec. 30, 1963, Ser. No. 334,372
13 Claims. (Cl. 316—30)

This invention relates to an improved gettering device and particularly to such a device for removing common gases including hydrogen from an evacuated or semi-evacuated enclosure.

A getter is an active metal substance or device employed in conjunction with vacuum tubes and the like for the purpose of removing residual gases therefrom. A number of chemically active materials have been found suitable for this purpose, e.g., barium, strontium, magnesium, zirconium, titanium, thorium, tantalum and hafnium. Titanium and zirconium are known to rank among the best of getter materials but even they have certain limitations. For example, titanium does not successfully sorb hydrogen in addition to other gases at usual gettering temperatures. Other common gases such as oxygen, nitrogen, carbonaceous gases, etc., are both absorbed into the getter and absorbed at the surface of the getter. However, the adsorbed materials at the surface inhibit the gettering of hydrogen. When raised to higher temperatures, a titanium or zirconium getter sorbs surface oxides and the like but will sorb and retain only a small amount of hydrogen. The hydrogen tends to be given off as fast as taken up.

It is therefore an object of the present invention to provide an improved gettering device capable of removing hydrogen in addition to other common gases from an enclosure.

In accordance with the present invention, a first gettering material communicates between an enclosure which is to be evacuated and a second gettering material. The first material is maintained at a temperature higher than the usual gettering temperature for substantially completely absorbing and removing from its surface such gases as oxygen, nitrogen, carbonaceous gases, their oxides, etc., thereby allowing the sorption of hydrogen. At this temperature hydrogen diffuses through this first gettering material and is then sorbed by the second gettering material which is suitably maintained at a lower temperature. The gases other than hydrogen have been dissolved and retained in the first material and therefore cannot inhibit gettering of the hydrogen at the second material. The second gettering material may in practice comprise the same element or alloy as the first, the only difference then being its lower temperature.

In accordance with a particular embodiment of the present invention, the second gettering material is enclosed in an at least partially evacuated compartment, or one containing a noble gas. The second gettering material is spaced from the first gettering material, the first material separating the compartment from the enclosure or chamber from which gases are to be removed. Hydrogen passes through the first gettering material into the compartment containing the second gettering material causing a partial pressure of hydrogen in this compartment equal to that in the chamber being evacuated. The second gettering material sorbs the hydrogen in this compartment.

According to another embodiment of the present invention, the second material also allows passage or diffusion of the hydrogen therethrough, but is exposed to oxidation on the surface thereof remote from the first gettering material. For example, the remote surface of the second material is exposed to the atmosphere. Hydrogen passing through the first and second materials oxidizes at this surface. In a preferred instance, the latter material is palladium or a palladium alloy.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a cross-sectional view of a first embodiment according to the present invention, and
FIG. 2 is a cross-sectional view of a second embodiment according to the present invention.

The function of a gettering device is the removal, to a desired degree, of unwanted gases from an evacuated chamber such as a vacuum tube or another electronic discharge device. In FIG. 1 such an enclosure 1 comprises by way of example a glass electron discharge device including a light modulating medium 2 capable of deformation when subject to an electric charge. Medium 2 is usually an oil having a tendency to give off hydrogen and hydrocarbon vapors during electron bombardment.

Also included in the electron discharge device is a filamentary cathode 3 supported from suitable lead-in conductors 4. This filamentary cathode produces an electron stream accelerated towards modulating medium 2. To produce this attraction, a source of voltage 6 supplies a voltage on the order of 10 kilovolts to a conducting layer 5 located behind medium 2. Another voltage source, 7, heats filamentary cathode 3. In the interest of simplification, further electrodes used in focusing and controlling the electron stream have been omitted, since these components are not related to the present invention.

The gettering device, 8, in accordance with the present invention, for removing gases from enclosure 1, includes a first gettering material and a second hydrogen-pervious or gettering material separated from the enclosure by the first gettering material. The materials used are suitably titanium, zirconium, tantalum, hafnium or alloys thereof, titanium and zirconium being preferred. In the embodiment of FIG. 1, a first gettering material takes the form of an open ended cylinder 9 communicating with the interior of enclosure 1 at passage 11. A second gettering material, which may in fact have the same composition as the first material, is embodied as a cylinder 10, larger in diameter and length than cylinder 9 for surrounding cylinder 9 in spaced relation thereto. Sealing means 12 joins the open ended cylinders 9 and 10 to electron discharge device 1 and also closes off the space between cylinders 9 and 10 to form a second chamber or compartment 13 therebetween. Compartment 13 is evacuated or contains a noble gas. The sealing means 12 may conveniently comprise a forsterite or alumina ceramic ring having nickel shim seals between the ceramic and cylinders 9 and 10. Alternatively sealing means 12 may be formed of a metal which doesn't dissolve hydrogen, e.g., platinum.

A heater element 14, disposed inside cylinder 9, is used for the purpose of heating cylinder 9 by thermal or electron radiation. Source 7 or another convenient source energizes the element 14. At the desired temperature of cylinder 9, common gases such as oxygen and nitrogen and various compounds they may form with the gettering material or otherwise, are substantially absorbed into the gettering material, becoming trapped in the metal lattice. When cylinder 9 is formed of titanium, a suitable temperature is in the range of 700° C. to 1200° C. Cylinder 9 is desirably narrowed or restricted in its wall thickness between the area of heating element 14 and ceramic seal 12 providing a heat choke for retaining the heat to cylinder 9.

The inside surface of cylinder 9 is clean at these temperatures and free to absorb hydrogen. At such temperatures the metal lattice does not trap hydrogen, but does dissolve a limited amount of hydrogen which tends to diffuse through the cylinder 9 into intermediate compartment 13. The partial pressure of hydrogen within compartment 13 becomes the same as the partial pressure of hydrogen within cylinder 9 which is also equal to the hydrogen partial pressure within the interior of enclosure 1. However, cylinder 10, the temperature of which will be less than cylinder 9 because of its greater distance from heating element 14, will satisfactorily take up hydrogen at the lower temperature. The partial pressure of hydrogen in compartment 13 will become lower and thus more hydrogen diffuses into compartment 13 until hydrogen is substantially removed from the interior of enclosure 1. A suitable temperature of operation for cylinder 10 is in the range between 500° C. and 25° C. Cylinder 10 is characterized by dimensions and heat conducting and radiating capabilities as will maintain cylinder 10 in this temperature range. In a specific example, cylinder 10 has a wall thickness on the order of 100 mils, spaced about 50 mils from cylinder 9. In this instance cylinder 9 has a wall thickness on the order of 10 to 20 mils.

Various hydrocarbons produced at medium 2 under electron bombardment are satisfactorily removed employing the gettering device in accordance with the present invention. For example, methane is disassociated and carbon dissolved at cylinder 9 at a temperature of approximately 1200° C. The carbon is retained in cylinder 9 while hydrogen diffuses therethrough to be then gettered at cylinder 10. Particularly at temperatures on the order of 1200° C. for the inner cylinder, zirconium or one of the other more refractory metals is an advantageous gettering material for the inner cylinder because of such material's lower vapor pressure. The outer cylinder may be less refractory because of its lower operating temperature. Titanium, zirconium, and titanium-zirconium alloys are most desirable for the outer cylinder. Alloys of the latter type are set forth and claimed in Stout and Gibbons Patent 2,926,981, granted March 1, 1960, and assigned to the assignee of the present invention.

A second embodiment in accordance with the present invention is illustrated in FIG. 2, wherein like reference numerals refer to like components. In FIG. 2 a second gettering or hydrogen pervious material cylinder 15 is shown immediately surrounding cylinder 9 without an appreciable space therebetween. In this case the outer cylinder will operate at a temperature similar to that of the inner cylinder. Cylinder 9 getters common gases at a temperature providing an inner surface clean enough to allow hydrogen diffusion through cylinder 9. Cylinder 15 is advantageously formed of palladium or a palladium alloy, for example an alloy containing 25 percent silver. In this case palladium cylinder 15 receives sufficient heat from heating element 14 to oxidize its outer surface when exposed to the atmosphere or other oxidizing environment. The palladium cylinder 15 "pumps" hydrogen therethrough and the hydrogen is also oxidized at the outer surface. In accordance with another variation of the present invention, palladium cylinder 15 may be spaced from cylinder 9 in the manner of FIG. 1, the palladium cylinder being heated by radiation from the inner cylinder. Again, hydrogen diffuses through cylinder 9 establishing a partial pressure in the space between cylinders equal to that inside cylinder 9. Palladium "pumps" hydrogen through cylinder 15 where it is oxidized at the outer surface. A method particularly relating to pumping hydrogen through a palladium or palladium alloy diaphragm is more fully described and claimed in the copending application of Virgil L. Stout and James R. Young, Serial No. 158,460, filed December 11, 1961, now Patent No. 3,214,359, and assigned to the assignee of the present invention.

Although a cylindrical configuration is illustrated in describing principal embodiments of the gettering device according to the present invention, it will be appreciated by those skilled in the art that the invention may take on many physical shapes. For example, the first gettering material may simply form a flat diaphragm or window disposed directly across an aperture in the side wall of the chamber being evacuated, with the second gettering material being adjacent thereto either in spaced relation or in contact with the first material. In any case, the first gettering material may be described as a closure means sealing off the chamber being evacuated and separating the second gettering material from such chamber, wherein the first gettering material communicates between the chamber being evacuated and the second gettering material or a compartment defined between the first and second gettering materials.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A gettering device for removing gases from a first chamber comprising a second at least partially evacuated chamber, closure means separating said chambers including a thickness of first gettering material communicating between said chambers, means for heating said first gettering material to a temperature for sorbing gases in said first chamber and passing hydrogen into said second chamber, and second gettering material located in said second chamber and generally spaced from said closure for sorbing the hydrogen passing through said first gettering material.

2. A gettering device for removing gases from a first chamber comprising a second chamber, a first gettering material separating said first chamber from said second chamber, heating means for raising the temperature of said first gettering material for increasing the gas sorption by said first gettering material and at which temperature hydrogen diffuses through said first gettering material, and second gettering material in said second chamber adjacent said first gettering material, the temperature of which is lower than said first gettering material so that hydrogen passing through said first gettering material is sorbed in said second gettering material.

3. A gettering device for removing gases from a first chamber comprising a second at least partially evacuated chamber, a first gettering material separating said first chamber and said second chamber, heating means for raising the temperature of said first gettering material for increasing the gas sorption by said first gettering material and at which temperature hydrogen diffuses through said first gettering material, and second gettering material in said second chamber adjacent said first gettering material, the temperature of which is lower than said first gettering material so that hydrogen passing through said first gettering material is sorbed in said second gettering material.

4. A gettering device for removing gases from a first chamber comprising a first thickness of first gettering material in communication with said chamber, heating means for raising the first gettering material to a temperature at which common gases except hydrogen are sorbed by said first gettering material but at which temperature hydrogen diffuses through said first gettering material, and a second body of hydrogen pervious material, said first gettering material intervening between said chamber and said second body of material, providing communication only of hydrogen from said chamber to said second body of material.

5. The gettering device according to claim 4 wherein said first and second materials are gettering materials chosen from the group consisting of titanium, zirconium, tantalum, hafnium, and alloys thereof.

6. The gettering device according to claim 4 wherein the second material is chosen from the group consisting of palladium and palladium alloys.

7. The gettering device according to claim 4 wherein the first and second materials are in substantial contact.

8. A gettering device for removing gases from a first chamber comprising a first thickness of first gettering material in communication with said chamber, heating means for raising the first gettering material to a temperature at which common gases except hydrogen are sorbed by said first gettering material but at which temperature hydrogen diffuses through said first gettering material, and a second body of hydrogen pervious material separated from said chamber by said first gettering material, which body of said second material sorbs hydrogen passing through said first gettering material.

9. A gettering device for removing gases from a first chamber comprising a first thickness of first gettering material in communication with said chamber, heating means for raising the first gettering material to a temperature at which common gases except hydrogen are sorbed by said first gettering material but at which temperature hydrogen diffuses through said first gettering material, and a second body of material capable of passing hydrogen by diffusion, said second material being separated from said chamber by said first gettering material, said second material having a surface exposed to an oxidizing atmosphere on the side thereof remote from said first gettering material so that hydrogen passing through said first and second materials is oxidized at said surface.

10. The gettering device according to claim 9 wherein said second material is palladium.

11. The gettering device according to claim 9 wherein said second material is an alloy of palladium and silver.

12. The gettering device according to claim 9 wherein the first and second materials are in substantial contact.

13. A gettering device for removing gases from a first chamber comprising a first thickness of first gettering material in communication with said chamber, heating means for raising the first gettering material to a temperature at which common gases except hydrogen are sorbed by said first gettering material but at which temperature hydrogen diffuses through said first gettering material, and a second body of material capable of diffusing hydrogen therethrough, said second material being separated from said chamber by said first gettering material, said second material being heated to a somewhat lower temperature by said first gettering material, said second material having a surface exposed to an oxidizing atmosphere on the side thereof remote from said first gettering material so that hydrogen passing through said first and second material is oxidized at said surface.

No references cited.

FRANK E. BAILEY, *Primary Examiner.*